(12) United States Patent
Tsai

(10) Patent No.: US 7,090,346 B2
(45) Date of Patent: Aug. 15, 2006

(54) EYEGLASSES WITH A LENS MEMBER EASILY MOUNTABLE TO AND REMOVABLE FROM A FRAME MEMBER

(76) Inventor: Chiang-Tung Tsai, No. 10-1, Lane 38, Chung-Yi 1st St., Jen-Te Hsiang, Tainan Hsien (TW)

( * ) Notice: Subject to any disclaimer, the term of this patent is extended or adjusted under 35 U.S.C. 154(b) by 0 days.

(21) Appl. No.: 11/006,607

(22) Filed: Dec. 8, 2004

(65) Prior Publication Data

US 2006/0119790 A1    Jun. 8, 2006

(51) Int. Cl.
*G02C 1/02* (2006.01)
(52) U.S. Cl. .............................. 351/110; 351/83; 351/86
(58) Field of Classification Search ................. 351/106, 351/103, 86, 83, 120, 110, 41
See application file for complete search history.

(56) References Cited

U.S. PATENT DOCUMENTS 6,742,890 B1 *   6/2004   Teng ........................... 351/86

* cited by examiner

*Primary Examiner*—Hung Xuan Dang
(74) *Attorney, Agent, or Firm*—Pearl Cohen Zedek Latzer, LLP

(57) ABSTRACT

Eyeglasses have a lens member, a frame member and two temples. The lens member includes opposite front and rear lens surfaces, two through holes at left and right ends of the lens member, and an insert hole disposed between the through holes. The frame member includes a middle frame portion abutting against the front lens surface of the lens member, two retaining frame portions formed respectively on left and right ends of the middle frame portion and extending respectively through the through holes in the lens member, and an insert bar extending rearwardly from the middle frame portion and inserted into the insert hole in the lens member. The retaining frame portions abut against the rear lens surface of the lens member. The temples extend respectively and rearwardly from the retaining frame portions of the frame member.

3 Claims, 7 Drawing Sheets

EYEGLASSES WITH A LENS MEMBER EASILY MOUNTABLE TO AND REMOVABLE FROM A FRAME MEMBER

BACKGROUND OF THE INVENTION

1. Field of the Invention

This invention relates to eyeglasses, more particularly to eyeglasses that include a lens member, which can be easily mounted to and removed from a frame member.

2. Description of the Related Art

For convenience in use, one frame member is associated with several lens members. As such, there is a need for a structure that enables the mounting of any of the lens members to the frame member with ease.

SUMMARY OF THE INVENTION

The object of this invention is to provide eyeglasses that have a lens member, which can be easily mounted to and removed from a frame member.

According to this invention, eyeglasses have a lens member, a frame member and two temples. The lens member includes opposite front and rear lens surfaces, two through holes at left and right ends of the lens member, and an insert hole disposed between the through holes. The frame member includes a middle frame portion abutting against the front lens surface of the lens member, two retaining frame portions formed respectively on left and right ends of the middle frame portion and extending respectively through the through holes in the lens member, and an insert bar extending rearwardly from the middle frame portion and inserted into the insert hole in the lens member. The retaining frame portions abut against the rear lens surface of the lens member. The temples extend respectively and rearwardly from the retaining frame portions of the frame member. Removal of the retaining frame portions of the frame member from the through holes in the lens member results in both disengagement of the insert bar of the frame member from the insert hole in the lens member and ultimate removal of the frame member from the lens member.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
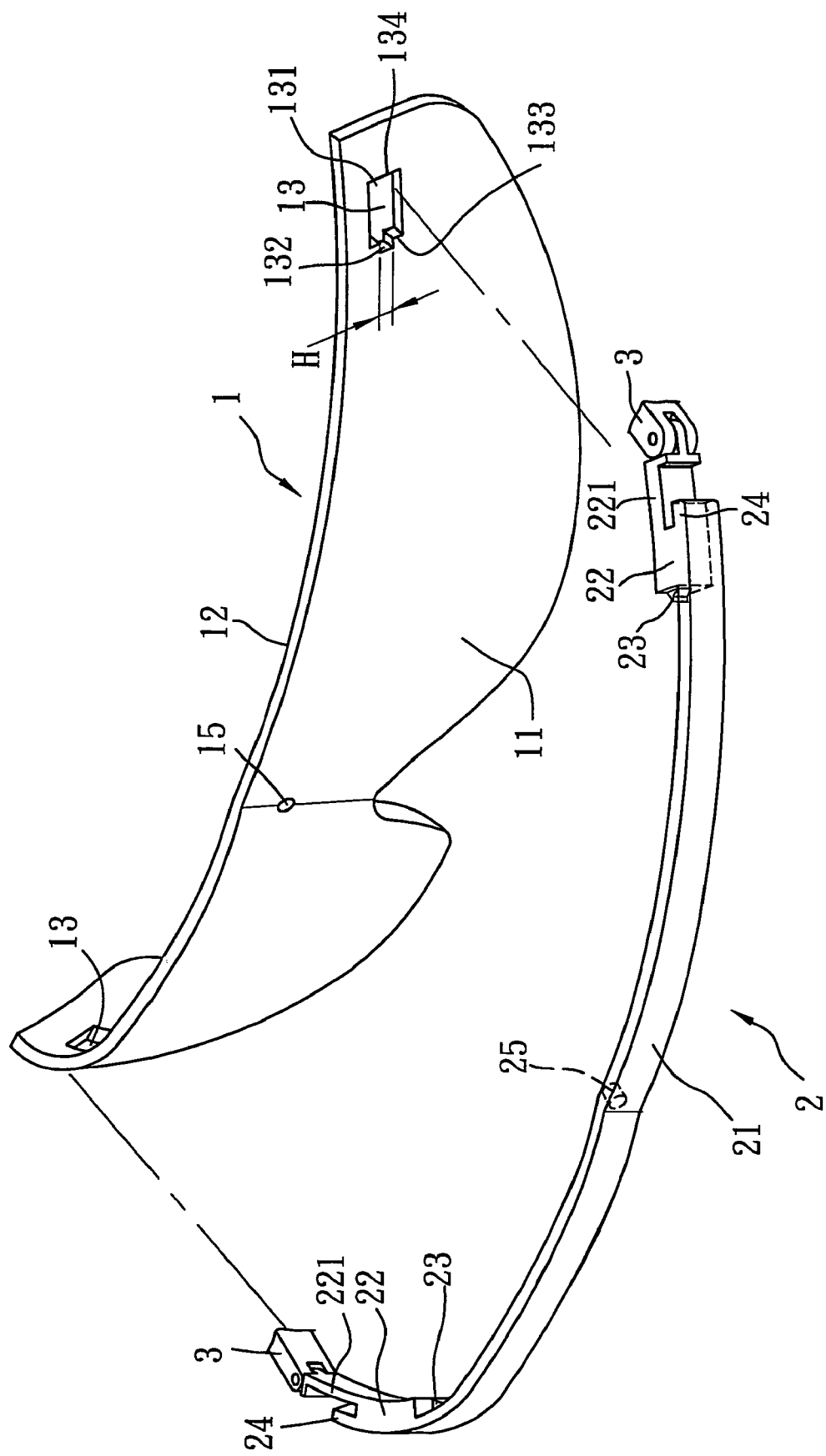
FIG. 1 is a fragmentary, partly exploded perspective view of the preferred embodiment of eyeglasses according to this invention, in which portions of two temples are removed for the sake of clarity.
Figure 2:
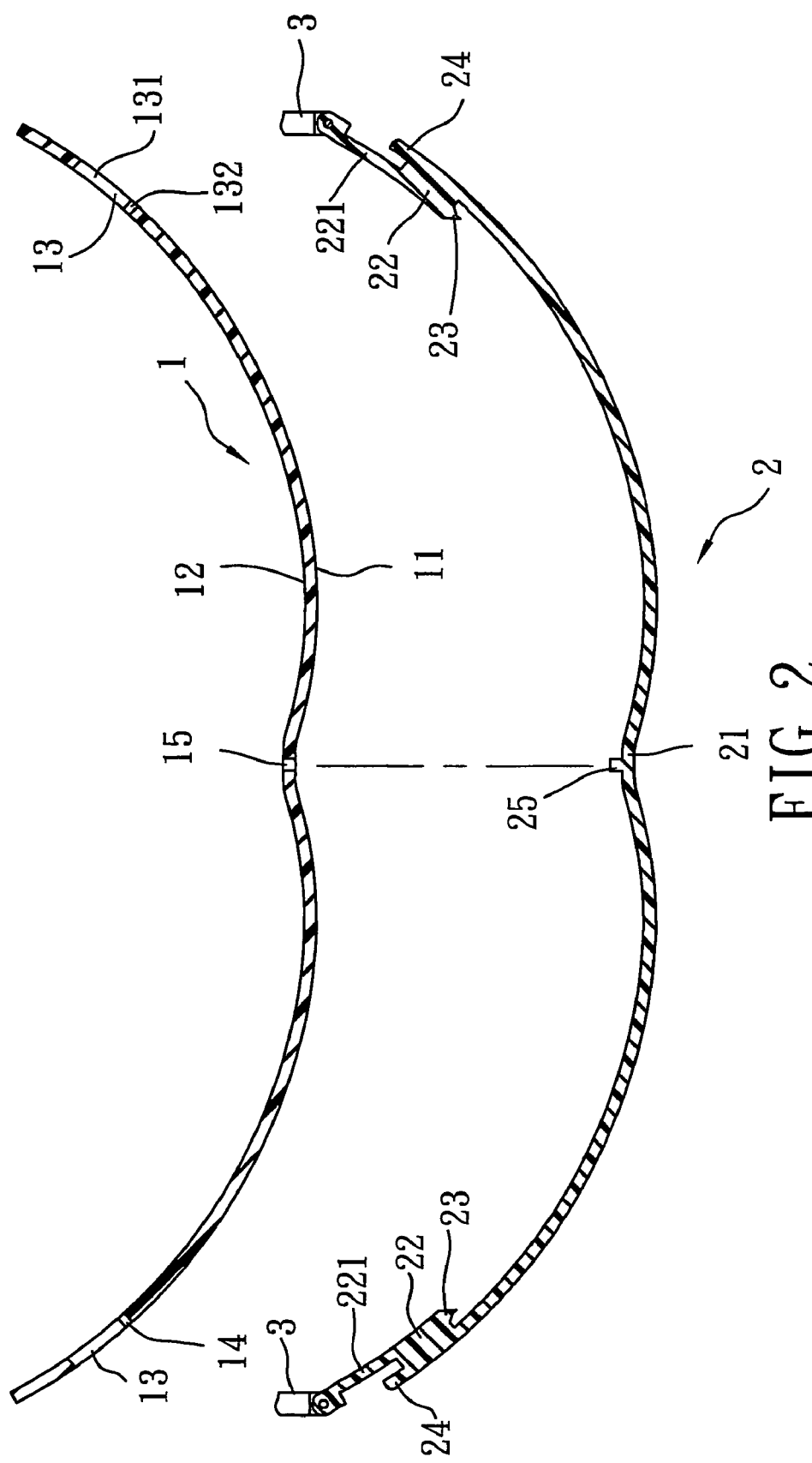
FIG. 2 is a fragmentary, partly exploded sectional view of the preferred embodiment.
Figure 3:
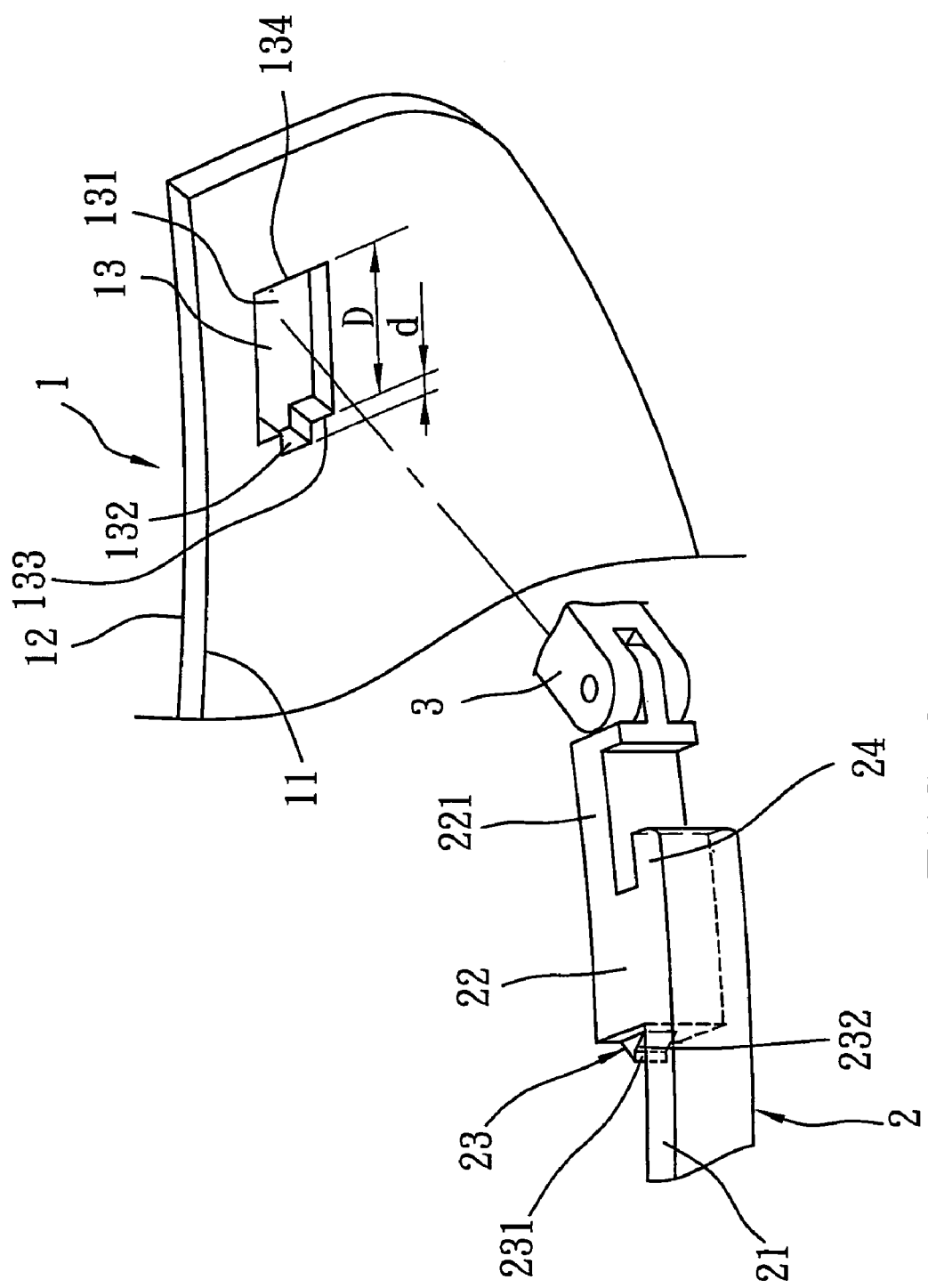
FIG. 3 is a fragmentary, partly exploded perspective view of the preferred embodiment.
Figure 4:
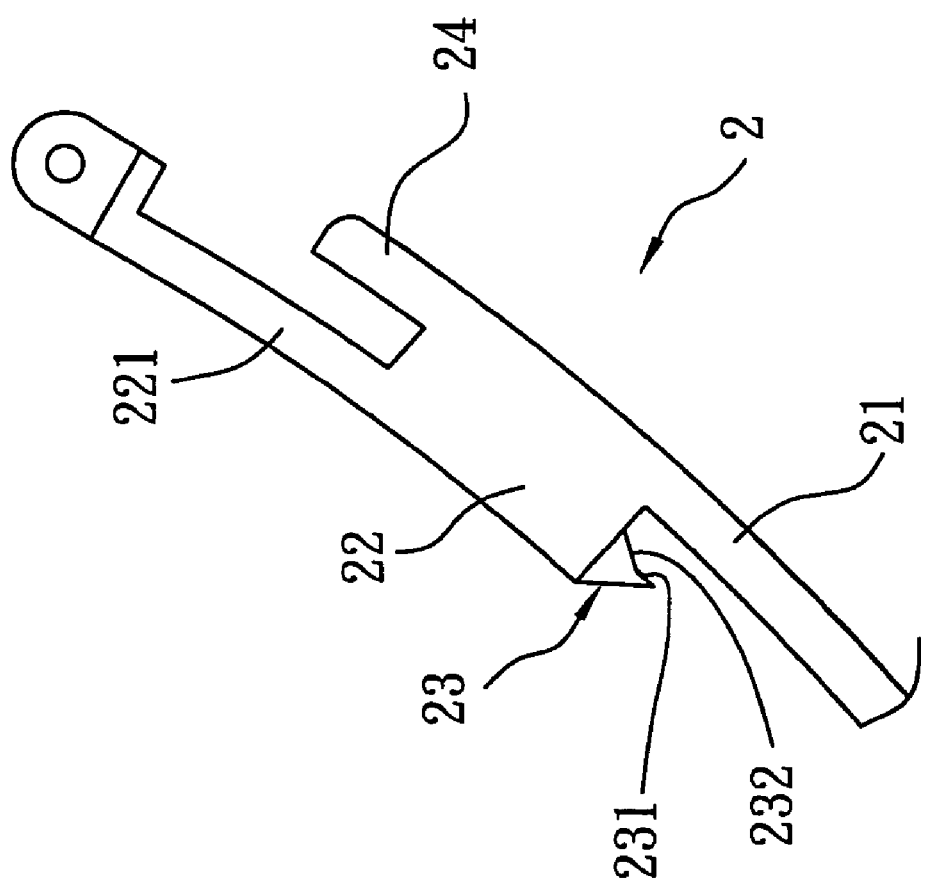
FIG. 4 is a fragmentary top view of a frame member of the preferred embodiment.
Figure 5:
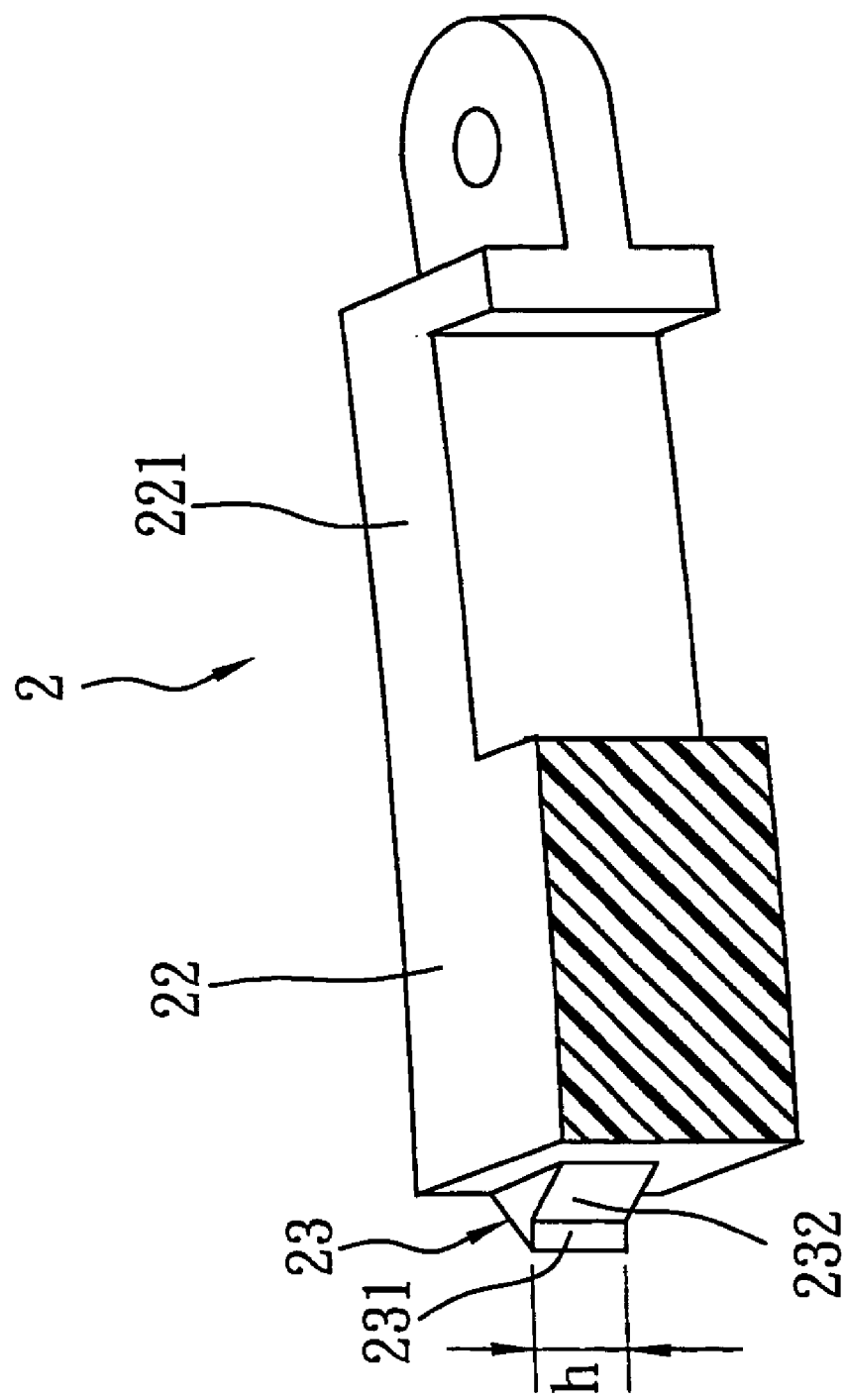
FIG. 5 is a perspective view of a retaining frame portion of the frame member of the preferred embodiment.

Referring to FIGS. 1 to 7, the preferred embodiment of eyeglasses according to this invention is shown to include a lens member 1, a frame member 2, and two temples 3 extending respectively and rearwardly from left and right ends of the frame member 2. The temples 3 are mounted pivotally to the frame member 2 in a known manner. Alternatively, the temples 3 may be formed integrally with the frame member 2.

The lens member 1 is unitary, is made of a plastic material, and is configured as a curved plate. The lens member 1 includes a front lens surface 11, a rear lens surface 12 opposite to the front lens surface 11, two through holes 13 formed through the lens member 1 and disposed respectively at left and right ends of the lens member 1, and an insert hole unit including an insert hole 15 formed through a middle portion of the lens member 1. Each of the through holes 13 includes a main hole portion 131 extending a first distance (D) (see FIG. 3) along a longitudinal direction of the corresponding through hole 13 of the lens member 1, and an extension hole portion 132 extending a second distance (d) (see FIG. 3) along the longitudinal direction of the corresponding through hole 13 in the lens member 1. The second distance (d) is smaller than the first distance (D). Each of the main hole portions 131 has inner and outer sides 133, 134 (see FIGS. 1 and 3) opposite to each other along the longitudinal direction of the corresponding through hole 13. Each of the extension hole portions 132 extends from a middle portion of the inner side 133 of the corresponding main hole portions 131 substantially in a direction away from the outer side 134 of the corresponding main hole portion 131.

The frame member 2 is made of a plastic material or a metal material, and is configured as a curved rod. The frame member 2 includes a middle frame portion 21 disposed in front of a top end of the lens member 1, and two retaining frame portions 22 formed respectively and integrally with and disposed behind left and right ends of the middle frame portion 21. The retaining frame portions 22 extend respectively through the through holes 13 in the lens member 1. Each of the retaining frame portions 22 has a lens-abutting portion 221. Two retaining projections 23 are formed respectively on the retaining frame portions 22, extend inwardly, and are aligned respectively with the extension hole portions 132 of the through holes 13 in the lens member 1. Two front abutment stubs 24 extend respectively, integrally, and outwardly from the left and right ends of the middle frame portion 21, and are respectively spaced apart from the lens-abutting portions 221 of the retaining frame portions 22. An insert bar 25 extends integrally and rearwardly from the middle portion of the frame member 2, and is inserted into the insert hole 15 in the lens member 1.

Alternatively, the insert hole unit includes a plurality of insert holes 15 formed through the lens member 1 between the through holes 13, and the frame member 2 includes a plurality of integral insert bars 25 inserted respectively into the insert holes 15.

Figure 6:
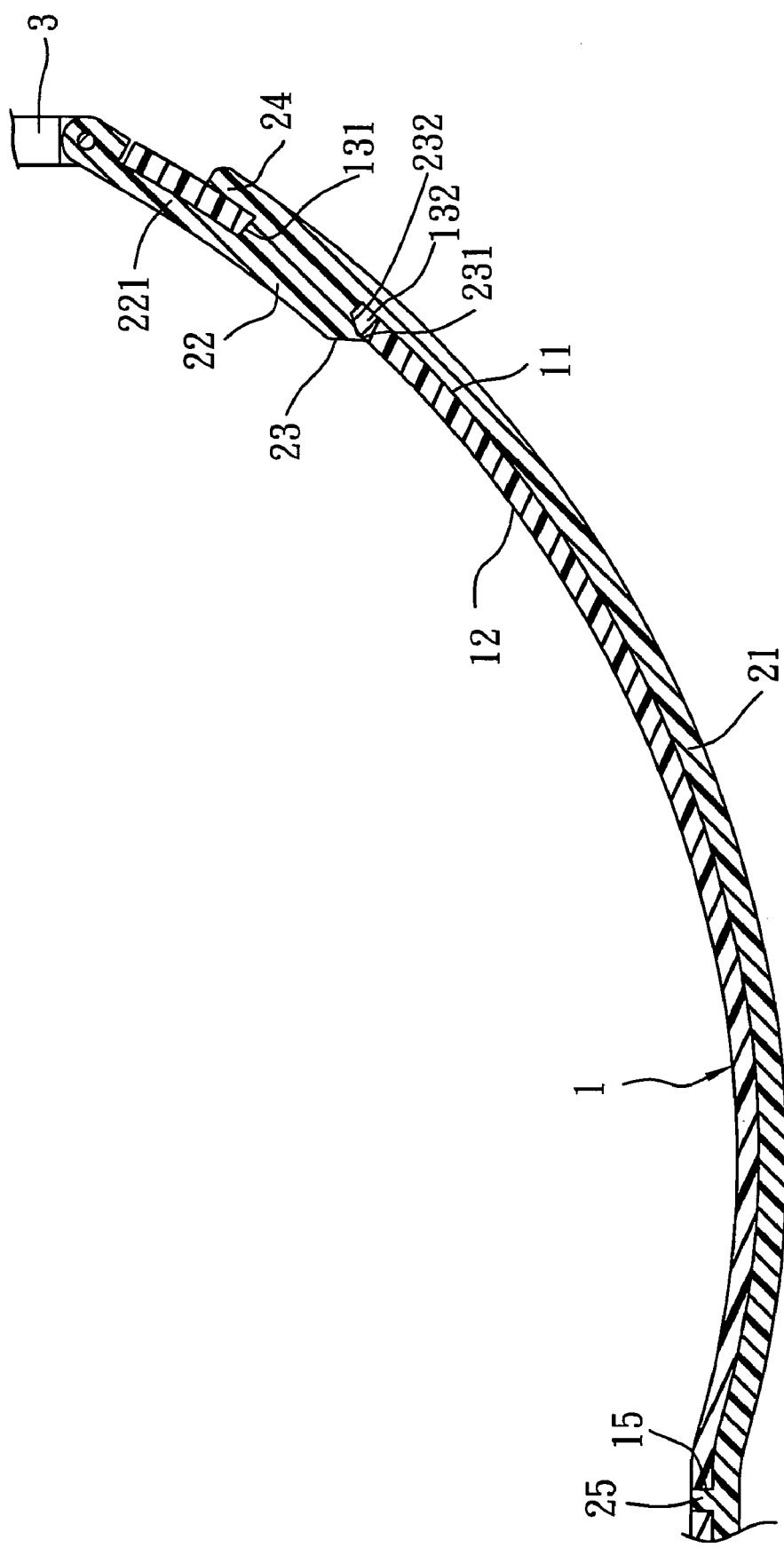
FIG. 6 is a fragmentary sectional view of the preferred embodiment, illustrating how the frame member is mounted to a lens member.
Figure 7:
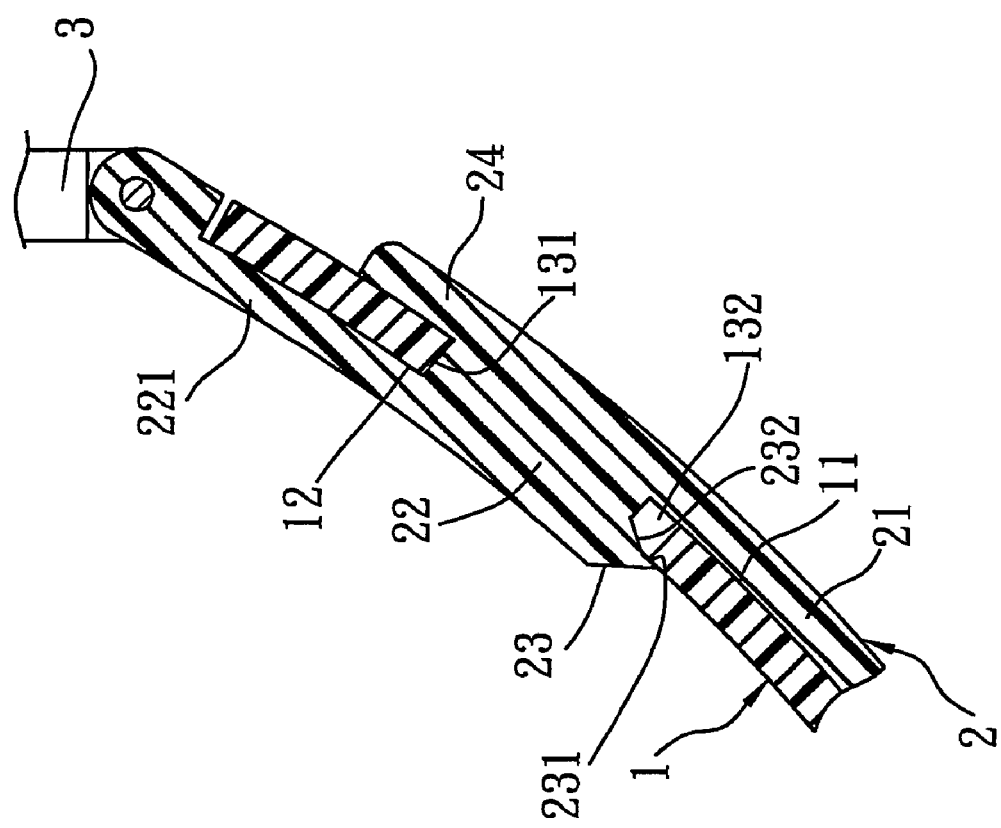
FIG. 7 is a fragmentary sectional view of the preferred embodiment, illustrating how the retaining frame portion of the frame member is engaged within a through hole in the lens member.

The middle frame portion 21 and the front abutment stubs 24 of the frame member 2 abut against the front lens surface 11 of the lens member 1, as shown in FIG. 6, thereby preventing rearward movement of the frame member 2 relative to the lens member 1. The lens-abutting portions 221 of the retaining frame portions 22 abut against the rear lens surface 12 of the lens member 1, as shown in FIG. 7, thereby preventing forward movement of the frame member 2 relative to the lens member 1. Therefore, the frame member 2 closely contacts the lens member 1.

Each of the retaining projections 23 is disposed behind the middle frame portion 21 of the frame member 2, and has a rear abutment face 231 that abuts against the rear lens surface 12 of the lens member 1, and a limiting face 232 that is integrally connected to and inclined with respect to the rear abutment face 231 and that is disposed within the extension hole portion 13 of the corresponding through hole 13 in the lens member 1. The extension hole portion 132 of each of the through holes 13 in the lens member 1 extends a third distance (H) (see FIG. 1) along a transverse direction of the corresponding through hole 13. Each of the limiting faces 232 extends a fourth distance (h) (see FIG. 5) along the transverse direction of the corresponding through hole 13 in the lens member 1. The fourth distance (h) is slightly smaller than the third distance (H) so as to prevent vertical movement of the frame member 2 relative to the lens member 1.

The through holes 13 in the lens member 1 are sized so as to allow for passage of the temples 3 therethrough. The frame member 2 can be somewhat flexed so as to allow for movement of the retaining frame portions 22 of the frame member 2 through the through holes 13 in the lens member 1. Removal of the retaining frame portions 22 of the frame member 2 from the through holes 13 in the lens member 1 results in both disengagement of the insert bar 25 of the frame member 2 from the insert hole 15 in the lens member 1 and ultimate removal of the frame member 2 from the lens member 1. Thus, the lens member 1 can be replaced with ease.

With this invention thus explained, it is apparent that numerous modifications and variations can be made without departing from the scope and spirit of this invention. It is therefore intended that this invention be limited only as indicated by the appended claims.

I claim:

1. Eyeglasses comprising:
   a lens member including a front lens surface, a rear lens surface opposite to said front lens surface, two through holes formed through said lens member and disposed respectively at left and right ends of said lens member, and an insert hole formed in said front lens surface between said through holes;
   a frame member configured as a curved rod and including
      a middle frame portion abutting against said front lens surface of said lens member and having left and right ends,
      two retaining frame portions formed respectively on said left and right ends of said middle frame portion and extending respectively through said through holes in said lens member, each of said retaining frame portions having a lens-abutting portion abutting against said rear lens surface of said lens member so as to prevent forward movement of said frame member relative to said lens member, and
      an insert bar extending integrally and rearwardly from said middle frame portion and inserted into said insert hole in said lens member; and
   two temples extending respectively and rearwardly from said retaining frame portions of said frame member, wherein each of said through holes in said lens member includes a main hole portion having inner and outer sides opposite to each other along a longitudinal direction of a corresponding one of said through holes in said lens member, and an extension hole portion extending inwardly from an intermediate portion of said inner side of said main hole portion, said frame member further including two retaining projections that are formed respectively and integrally with said retaining frame portions of said frame member, that extend inwardly, and that are aligned respectively with said extension hole portions of said through holes in said lens member, each of said retaining projections being disposed behind said middle frame portion of said frame member and having a rear abutment face that abuts against said rear lens surface of said lens member, and a limiting face that is integrally connected to and inclined with respect to said rear abutment face and that is disposed within said extension hole portion of a corresponding one of said through holes in said lens member, said limiting faces being sized so as to prevent vertical movement of said frame member relative to said lens member.

2. The eyeglasses as claimed in claim 1, wherein said main hole portion of each of said through holes in said lens member extends a first distance along said longitudinal direction of the corresponding one of said through holes in said lens member, said extension hole portion of each of said through holes in said lens member extending a second distance along said longitudinal direction of the corresponding one of said through holes in said lens member, said second distance being smaller than said first distance.

3. Eyeglasses comprising:
   a lens member including a front lens surface a rear lens surface opposite to said front lens surface two through holes formed through said lens member and disposed respectively at left and right ends of said lens member, and an insert hole formed in said front lens surface between said through holes;
   a frame member configured as a curved rod and including
      a middle frame portion abutting against said front lens surface of said lens member and having left and right ends,
      two retaining frame portions formed respectively on said left and right ends of said middle frame portion and extending respectively through said through holes in said lens member, each of said retaining frame portions having a lens-abutting portion abutting against said rear lens surface of said lens member so as to prevent forward movement of said frame member relative to said lens member, and
      an insert bar extending integrally and rearwardly from said middle frame portion and inserted into said insert hole in said lens member; and
   two temples extending respectively and rearwardly from said retaining frame portions of said frame member, wherein said frame member further includes two front abutment stubs that extend respectively, integrally, and outwardly from said left and right ends of said middle frame portion of said frame member and that are respectively spaced apart from said lens-abutting portions of said retaining frame portions of said lens frame, each of said front abutment stubs abutting against said front lens surface of said lens member so as to prevent rearward movement of said frame member relative to said lens member.

* * * * *